United States Patent
Takkinen

(10) Patent No.: US 9,009,925 B2
(45) Date of Patent: Apr. 21, 2015

(54) LOAD-STRAP TENSIONING DEVICE

(75) Inventor: Esa Takkinen, Lauteala (FI)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 13/813,147

(22) PCT Filed: Oct. 25, 2011

(86) PCT No.: PCT/FI2011/050932
§ 371 (c)(1),
(2), (4) Date: Apr. 16, 2013

(87) PCT Pub. No.: WO2012/095551
PCT Pub. Date: Jul. 19, 2012

(65) Prior Publication Data
US 2013/0239374 A1    Sep. 19, 2013

(30) Foreign Application Priority Data
Jan. 11, 2011    (FI) .................................... 20115029

(51) Int. Cl.
*B60P 7/08*    (2006.01)
(52) U.S. Cl.
CPC ...................................... *B60P 7/083* (2013.01)
(58) Field of Classification Search
CPC .......... B60P 7/083; B60P 7/06; B60P 7/0838; B60P 7/0846; A44B 11/125; Y10S 24/909; B65B 13/025; B25B 25/00
USPC ........................................... 24/68 CD, 69 CT
See application file for complete search history.

(56) References Cited

U.S. PATENT DOCUMENTS

| 2,146,104 | A | * | 2/1939 | Adamson | 254/218 |
|---|---|---|---|---|---|
| 4,268,012 | A | * | 5/1981 | Ruehle et al. | 254/223 |
| 4,324,023 | A | * | 4/1982 | Prete, Jr. | 24/68 CD |
| 5,282,296 | A | * | 2/1994 | Huang | 24/68 CD |
| 5,819,377 | A | * | 10/1998 | Huang | 24/68 CD |
| 5,855,045 | A | * | 1/1999 | Miura | 24/68 CD |
| 5,943,742 | A | * | 8/1999 | Huang | 24/68 CD |

(Continued)

FOREIGN PATENT DOCUMENTS

| WO | WO 2006001714 A1 | * | 1/2006 | ............... B60P 7/08 |
|---|---|---|---|---|
| WO | WO 2007113373 A1 | * | 10/2007 | |
| WO | WO 2012126476 A1 | * | 9/2012 | |

*Primary Examiner* — Robert J Sandy
*Assistant Examiner* — David Upchurch
(74) *Attorney, Agent, or Firm* — Minder Law Group; Willy H. Wong

(57) ABSTRACT

A load-strap tensioning device, which includes a body, at an outer end of which there is a transverse pin, to which is fastenable a binding strap having a suitable fastener at its end, at an opposite end of the body there is a transverse spindle and at a distance from it a ratchet pin, which is at least partially transferrable from an opening being between the body, between the spindle and the ratchet pin there is a gap into which an end of another binding strap, is settable, to the part formed by the spindle and the ratchet pin are fastened ratchet wheels and to the body is fastened a catch device, which is fastened to the body movably in its longitudinal direction, and to the body is fastened a spring for pressing the catch device against the ratchet wheels, at the end of the body is rotatably fastened a body part, which includes a second catch device being pressable against the ratchet wheels. the ratchet pin and/or a part attached to it includes elements to prevent the ratchet pin from disengaging from the load-strap tensioning device.

7 Claims, 2 Drawing Sheets

(56) References Cited

U.S. PATENT DOCUMENTS

Figure 1:
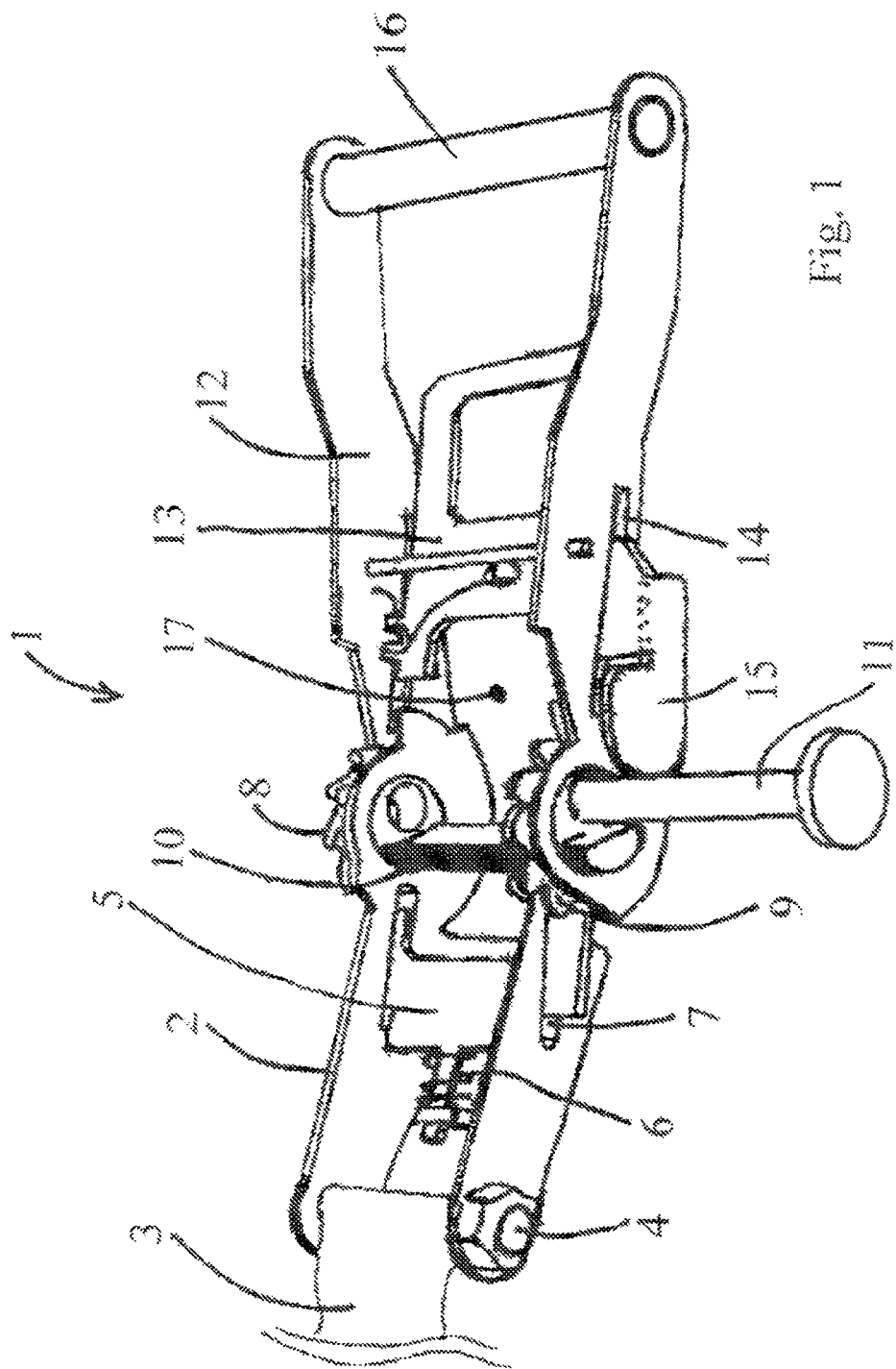

| | | | | |
|---|---|---|---|---|
| 6,158,932 | A * | 12/2000 | Little | 410/103 |
| 6,499,197 | B1 * | 12/2002 | Huang | 24/68 CD |
| 6,682,053 | B1 * | 1/2004 | Chou | 254/218 |
| 7,281,701 | B1 * | 10/2007 | Huang et al. | 254/218 |
| 7,510,168 | B1 * | 3/2009 | Lin | 254/218 |
| 8,157,245 | B2 * | 4/2012 | Huang | 254/218 |
| 2002/0153518 | A1 * | 10/2002 | Huang | 254/223 |
| 2003/0071251 | A1 * | 4/2003 | Hu | 254/218 |
| 2008/0244883 | A1 * | 10/2008 | Liu et al. | 24/68 CD |
| 2010/0025645 | A1 * | 2/2010 | Carlson et al. | 254/218 |

* cited by examiner

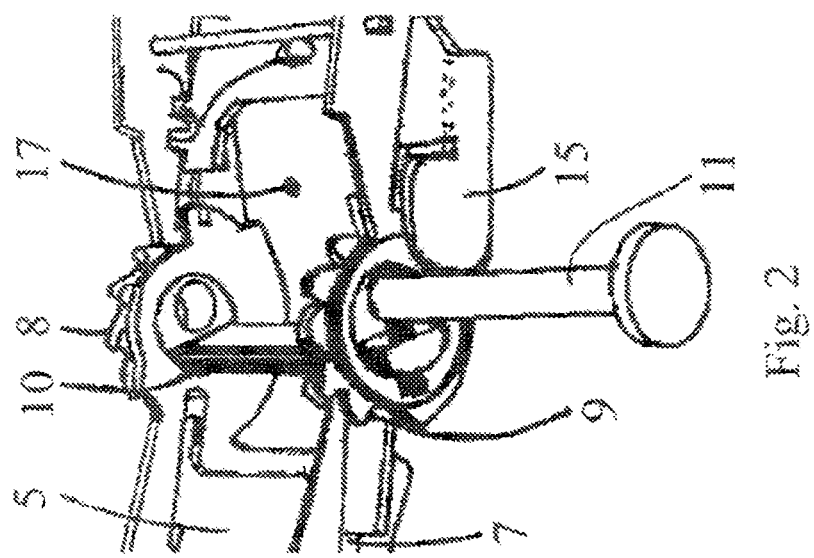
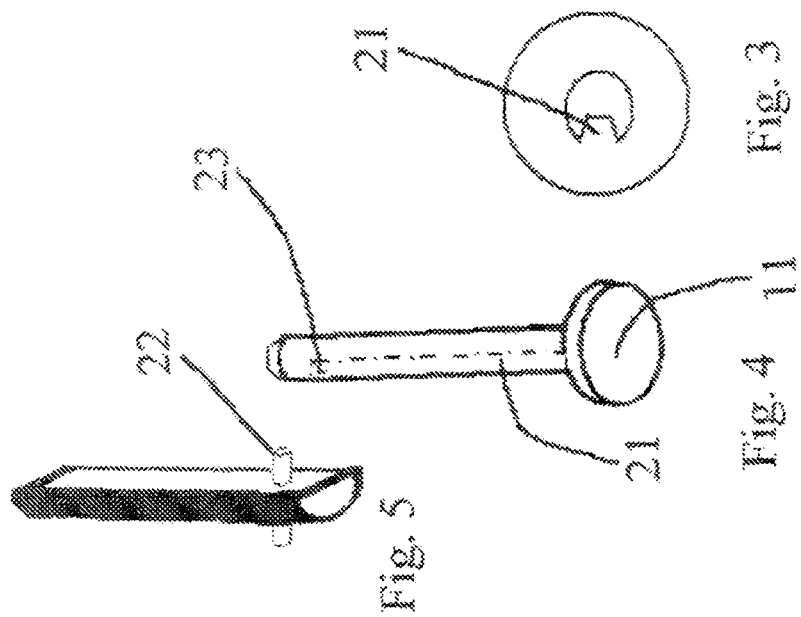

LOAD-STRAP TENSIONING DEVICE

This application is a national stage entry of International Application No. PCT/FI2011/050932, filed Oct. 25, 2011 and which claims benefit of Finnish Patent Application No. 20115029, filed Jan. 11, 2011. The above applications are incorporated by reference herein.

The invention relates to a load-strap tensioning device according to the preamble of claim 1.

Loads transported in vehicles and other modes of transport have to be fastened firmly in place. To tie a load in place, binding straps or load straps are used, which are tensioned by an operating device being here referred to as a load-strap tensioning device.

When fastening loads, a length of strap attached to the tensioning device is fastened by means of a hook or equivalent to a desired location. A second length of strap is similarly fastened by means of a hook or equivalent to another location with the purpose of forming a tight strap connection between these locations. In the load-strap tensioning device, there is a spindle, which consists of two halves having a gap between them. The free end of the latter length of strap is threaded through the gap and the strap is pretensioned by pulling the strap by hand almost as far through the gap as it will go. After this, the spindle is rotated by moving a lever belonging to the operating device back and forth, whereby the strap winds around the spindle and tenses at the same time. A ratchet wheel is attached to the spindle enabling the prevention of the spindle from rotating open while the spindle is rotated by the lever of the operating device in the tensioning direction of the strap.

Load straps are often very long and difficult to handle. The load straps have to be pulled through the gap in the tensioning device to be able to perform tensioning. To facilitate the use of the load strap, it is known to make at least one side of the spindle in the tensioning device movable, whereby it can be pulled out. A ratchet pin movable open and closed considerably facilitates the use of the load strap in the fastening and unfastening step. Such a load-strap tensioning device is described e.g. in European patent application 07730543.1.

When using the ratchet pin in question, there is a risk in some conditions that the ratchet pin is pulled too far outwards and it is able to disengage from the load-strap tensioning device. Then, fastening the ratchet pin in place can be awkward and it can consume a lot of working time.

An object of the invention is to introduce a load-strap tensioning device by means of which the above disadvantage is eliminated. A particular object of the invention is to introduce a load-strap tensioning device where the ratchet pin cannot disengage.

The object of the invention is provided with a load-strap tensioning device, which is characterised by what is presented in the claims.

Due to the structure according to the invention, the ratchet pin cannot fall off the device.

The invention will now be described in more detail with reference to the accompanying drawing in which FIG. 1 shows an axonometric view of a prior art load-strap tensioning device, FIG. 2 shows a partial view of the load-strap tensioning device according to FIG. 1, where the ratchet pin is a ratchet pin according to this application, FIGS. 3 and 4 show direct front and side views of the ratchet pin according to FIG. 2, and FIG. 5 shows a counterpart for the ratchet pin according to FIG. 3.

FIG. 1 shows a load-strap tensioning device 1, which includes a body 2 consisting of planar parts, at the outer end of which there is a transverse pin 4, to which is usually fixedly fastened a rather short strap 3, at the end of which there is a suitable fastening means, such as a hook. At the opposite end of the body, there is a transverse spindle 10 and at a distance from it a ratchet pin 11, between which there is a gap to which the end of the second length of strap is threaded. In the figure, the ratchet pin 11 is partially pulled out of the body. To the part formed by the spindle 10 and the ratchet pin 11 are fastened ratchet wheels 8 and 9. To the body 2 is fastened a catch device 5 which is fastened to the body to gaps 7 being in its both side plates movably in the longitudinal direction of the body. Furthermore, the catch device 5 is pressed against the ratchet wheels 8 and 9 by means of a spring 6 fastened to the body. This tensioning device is the so-called ratchet tensioner.

At the end of the body is rotatably fastened a second body part 12 which is a lever-like part. Like the body 2 described above, it consists of advantageously planar parts, which are attached from their outer end by a pin-like element 16 and form an operating handle. The body part 12 includes a catch device 13, which is movably fastened to gaps 14 being in both side plates of the body part. The catch device 13 is spring-loadedly pressable against the ratchet wheels 8 and 9.

When the operating handle is against the body in the closed position, the ratchet pin 11 is opened and the strap is set on top of the spindle 10. After this, the ratchet pin is pushed closed, whereby the strap remains under the ratchet pin. This is the initial situation.

As seen from FIG. 1 or 2, pulling the ratchet pin 11 out of the way opens a wide opening 17 through which a dirty or icy strap can be easily pulled. There is even no need to pull the strap through the opening 17, but the strap can be folded in two, the loop thus formed can be pushed into the opening 17 and the ratchet pin 11 can be pushed through from within the loop, thus creating the initial situation to start tensioning. The strap can be provided with one or more ready-made loops through which the ratchet pin 11 is pushed.

The rotating i.e. tensioning of the strap takes place by moving the body part 12 back and forth in relation to the body 2 and by utilising the ratchet wheels 8 and 9 fastened to the spindle 10 and the catch devices 5 and 13 contacting them in the rotation situation, the first of which is able to move by means of the spring 6 along the gaps 7 in both side plates of the body 2 against the ratchet wheels. The catch 5 prevents the ratchet wheels 8 and 9 from rotating 'backwards'. The rotation can be allowed by pulling the catch 5 out of the ratchet wheels.

The catch device 13 is also spring-loadedly pressed against the ratchet wheels 8 and 9. However, the catch 13 will not prevent the body part 12 from rotating in a direction where the catch 13 slides along the ratchet wheels 8 and 9 'forwards'. Rotating the body part 12 in the other direction still causes the catch to lock to the teeth of the ratchet wheel and the spindle 10 to rotate along the motion of the part 12. By moving the part 12 back and forth, the strap can be wound around the spindle and tensioned.

The operating device according to the invention can also be used as a separate part for tensioning a loosened load strap. Then, the operating device is taken to a suitable location on the loosened strap and the strap is set to run between the spindle 10 and the ratchet pin 11 by first pulling the ratchet pin 11 out of the way and then pushing it back closed such that the strap is between the spindle 10 and the ratchet pin 11. The back-and-forth motion of the body part 12 then tensions the strap as it winds around the spindles in both directions.

The catch 13 is combined with a protrusion 15 being outside the body part 12 which, when the ratchet pin 11 is not in place, prevents the catch from lowering into the position where winding can start. The catch will lower into said position only once the ratchet pin 11 has been pushed fully into place, allowing the catch protrusion 15 to move past the head of the ratchet pin 11. The protrusion 15 holds the ratchet pin 11 firmly in place preventing it from rising from its closed position.

When desiring to loosen the strap, both catches 5 and 13 are pulled out of the ratchet wheels. Additionally, it can be arranged for one of the catches 4, 13 to open automatically when the body parts 2 and 12 are opened nearly to a straight angle, whereby loosening the strap only requires opening the other catch. This can be easily implemented by suitably shaping the protrusion 15 like done here by way of an example.

The shape of the operating device according to the invention can be different in many ways from the traditional design described above. For instance, the cross-sectional shape of the spindle 10 and the ratchet pin 11 can be circular or angular or any other applicable shape.

Even though having described above the device including the spindle 10 and the ratchet pin 11, it is possible that some other embodiment includes only one spindle or ratchet pin having a slot, but which is still pullable out like the ratchet pin 11. Then, the strap is set in a suitable way into the opening 17 of the operating device, from where the ratchet pin has been pulled out of the way, and the ratchet pin is then pushed in place such that the strap comes to the slot or that one leg of the ratchet pin comes to pass through the loop.

On the side of the ratchet pin 11 of the load strap, there is a groove 21, which extends from the handle part almost to a pin end 23 where a fastening pin 22 impacts when opening. The impact pin fastens the spindle 10 fixedly in place.

When fastening the strap, it is set under the ratchet pin 11 pulled open and the ratchet pin is pushed closed, whereby the strap remains between the spindle 10 and the ratchet pin 11. Using the operating handle 16, the strap is tensioned tight and the handle is turned into the transport position against the device body. The protrusion part 15 of the catch 13 ensures that the ratchet pin 11 cannot accidentally protrude out even though the strap was loose. The part 15 also prevents incorrect fastening, because it contacts the ratchet pin 11. If the ratchet pin is not totally closed, the part 15 keeps the catch 13 detached from the ratchet wheels 8 and 9, and no force of the handle 16 is supplied to the ratchet wheels and no incorrect fastening occurs. When opening, the catch 13 is pulled out of the ratchet wheels and the handle is turned straight as an extension of the body 2, whereby the catches 5 and 13 do not stop the ratchet wheels but the strap is able to unwind. When the catch 13 is pulled into the open position, the ratchet pin 11 can be pulled open and the strap disengages from the device without having to pull it from between the spindle and the pin.

According to the invention, the ratchet pin 11 and/or a part attached to it includes an element 21 or elements 21, 22 to prevent the ratchet pin from disengaging from the load-strap tensioning device. According to FIGS. 2-4, the ratchet pin 11 includes a groove 21 in its longitudinal direction, which allows the ratchet pin to slide open onto the level of the ratchet wheels. The groove in the ratchet pin does not extend to the end of the ratchet pin, but the ratchet pin remains circular until the end. At the end of the spindle 10, there is a pin-like protrusion 22, which extends within the groove 21 of the ratchet pin and operates as a stopper. Hence, the ratchet pin 11 cannot in any case disengage from the device.

In various embodiments of the invention, different groove shapes in the ratchet pin are possible. The interior of the ratchet wheel can include a counterpart, which prevents the ratchet pin from going through the hole. In an embodiment, the ratchet pin is thicker of its end, whereby the thicker part cannot come through the opening of the ratchet wheel 9. The opening of the ratchet wheel can also include a protrusion or equivalent, which is at the point of the groove in the ratchet pin and prevents the ratchet pin from disengaging. In some embodiment, the ratchet pin includes threads at both ends. Other embodiments are also possible. The shape of the ratchet pin can be different in the various embodiments of the invention. It is possible that the shape of the first part of the ratchet pin is different from the part at the end, whereby the part at the end cannot transfer through the hole.

The invention is not limited to the described advantageous embodiments, but it can vary within the scope of the inventive idea presented in the claims.

The invention claimed is:

1. A load-strap tensioning device (1), comprising:
    a body (2);
    a distal end of the body (2) having a transverse pin (4);
    a binding strap (3) having a suitable fastener at one end of the binding strap (3), the binding strap (3) fastenable to the transverse pin (4);
    a proximal end of the body (2) opposite of the distal end, the proximal end having a transverse spindle (10);
    a ratchet pin (11) at a distance from the transverse spindle (10), the ratchet pin (11) is at least partially transferrable from an opening (17), the ratchet pin (11) fastened to ratchet wheels (8 and 9), the ratchet pin (11) having a longitudinal axis, the longitudinal axis perpendicularly intersecting both ratchet wheels (8 and 9);
    a gap between the transverse spindle (10) and the ratchet pin (11), into which an end of another binding strap is settable to a part formed by the transverse spindle (10);
    a first catch device (5) movably fastened to the body (2) in its longitudinal direction;
    a spring (6) fastened to the body (2), the spring (6) capable of pressing the catch device (5) against the ratchet wheels (8 and 9);
    a body part (12) rotatably fastened at the proximal end of the body (2), the body part (12) having a second catch device (13) that is pressable against the ratchet wheels (8 and 9);
    a groove (21) in the ratchet pin (11) and/or in a part attached to the ratchet pin, the groove (21) running parallel to the longitudinal axis;
    a first groove end on the groove (21), the groove (21) ending at the first groove end before a first end of the ratchet pin (11); and
    an engagement piece having a protrusion (22) capable of fitting into the groove (21), the protrusion (22) is engaged with the groove (21) and arranged to prevent the ratchet pin (11) from disengaging from the load-strap tensioning device (1).

2. A load-strap tensioning device according to claim 1, wherein the engagement piece is the transverse spindle (10).

3. A load-strap tensioning device according to claim 1, further comprising:
    a second end of the ratchet pin (11) having an end shape, the end shape is such that the ratchet pin (11) is not able to go through the opening (17);
    wherein a body of the ratchet pin (11) has an other shape, the other shape being different from the end shape.

4. A load-strap tensioning device according to claim 1, further comprising:
    a second groove end on the groove (21) opposite of the first groove end;

wherein the ratchet pin (11) is capable of sliding generally perpendicular to both ratchet wheels (8 and 9), the ratchet pin (11) capable of sliding between a first position and a second position, guided by the engagement between the protrusion (22) and the groove (21);

wherein in the first position, the ratchet pin (11) intersects both ratchet wheels (8 and 9); and wherein in the second position, the first groove end rests in an area between the ratchet wheels (8 and 9) and the second groove end rests outside of the area between the ratchet wheels (8 and 9).

5. A load-strap tensioning device according to claim 4, wherein the ratchet pin (11) is prevented from sliding beyond the first position and the second position.

6. A load-strap tensioning device according to claim 5, wherein the ratchet pin (11) is prevented from sliding past the second position when the protrusion (22) engages the first groove end.

7. A load-strap tensioning device according to claim 6, wherein the engagement piece is permanently affixed to the load-strap tensioning device (1) and intersects both ratchet wheels (8 and 9).

\* \* \* \* \*